(12) United States Patent
Chang et al.

(10) Patent No.: US 9,996,550 B2
(45) Date of Patent: Jun. 12, 2018

(54) PRESENTING INFORMATION BASED ON USER PROFILES

(71) Applicants: Verizon Patent and Licensing Inc., Arlington, VA (US); Cellco Partnership, Arlington, VA (US)

(72) Inventors: Patricia R. Chang, San Ramon, CA (US); Sagiv Draznin, Walnut Creek, CA (US); Arda Aksu, Martinez, CA (US); Steven R. Rados, Danville, CA (US); Thomas W. Haynes, San Ramon, CA (US); Deepak Kakadia, Union City, CA (US); Priscilla Lau, Fremont, CA (US); John F. Macias, Antelope, CA (US); Donna L. Polehn, Kirkland, WA (US)

(73) Assignees: Verizon Patent and Licensing Inc., Basking Ridge, NJ (US); Celico Partnership, Basking Ridge, NJ (US)

( * ) Notice: Subject to any disclaimer, the term of this patent is extended or adjusted under 35 U.S.C. 154(b) by 400 days.

(21) Appl. No.: 13/731,786

(22) Filed: Dec. 31, 2012

(65) Prior Publication Data
US 2014/0188873 A1   Jul. 3, 2014

(51) Int. Cl.
*G06F 17/30* (2006.01)

(52) U.S. Cl.
CPC .... *G06F 17/30241* (2013.01); *G06F 17/3087* (2013.01); *G06F 17/30699* (2013.01); *G06F 17/30864* (2013.01); *G06F 17/30867* (2013.01)

(58) Field of Classification Search
CPC ......... G06F 317/30241; G06F 17/3087; G06F 13/14; G06F 19/345; G06F 3/147; G06F 17/30528
See application file for complete search history.

(56) References Cited

U.S. PATENT DOCUMENTS

| | | | |
|---|---|---|---|
| 8,655,307 B1 * | 2/2014 | Walker | H04W 52/0212 455/343.5 |
| 2007/0061243 A1 * | 3/2007 | Ramer et al. | 705/37 |
| 2009/0216435 A1 * | 8/2009 | Zheng | G06F 17/3087 701/533 |
| 2010/0076968 A1 * | 3/2010 | Boyns et al. | 707/732 |
| 2010/0131963 A1 * | 5/2010 | Firminger et al. | 719/318 |
| 2011/0208736 A1 * | 8/2011 | Fitzpatrick et al. | 707/736 |
| 2012/0303266 A1 * | 11/2012 | Su | G01C 21/3476 701/420 |

\* cited by examiner

*Primary Examiner* — Mariela Reyes
*Assistant Examiner* — Courtney Harmon

(57) ABSTRACT

A server may be configured to receive behavior information associated with a user device. The behavior information may indicate a set of geographical locations at which the user device has been present. The server may generate a mode based on the behavior information. The mode may indicate a set of conditions based on which the mode is to be activated, and a set of information to be presented when the mode is activated. The server may output the mode to the user device. The user device may determine, after receiving the mode, that the set of conditions has been satisfied. The determining may be based on a geographical location of the user device. The user device may activate the mode, based on determining that the set of conditions has been satisfied; and may present at least a portion of the set of information, based on activating the mode.

20 Claims, 10 Drawing Sheets

800

Browse shared modes

| Mode name | Friend's name | Mode details |
|---|---|---|
| Running | Mike Anderson | Information about nearby running trails. |
| Fair Lakes Mall | <Sponsored> | Great deals and maps of Fair Lakes Mall! |
| Morning traffic | John Smith | Traffic info on 495 North near Bethesda. |
| Snacks | Jimmy Bean | Find nearby snacks. |
| Clothes sales | Jimmy Bean | Find nearby sales on clothes. |

700

Create/edit mode

| Mode name | Weekly road trip |
| Schedule | Tuesday 3:00-4:30PM, weekly |
| Start location | Santa Monica, CA |
| End location | Long Beach, CA |
| Type | Convenience store coupons |
| Description | This is for my weekly trip to LB. |

( Save )  ( Share )

FIG. 7

PRESENTING INFORMATION BASED ON USER PROFILES

BACKGROUND

Cellular telephones may be used for a variety of purposes. For example, cellular telephones may be used for voice applications, video conferencing applications, and messaging applications. Cellular providers may provide messages to subscribers' cellular telephones via email messages, short messaging service ("SMS") messages, or other types of messages.

BRIEF DESCRIPTION OF THE DRAWINGS

FIG. 7 illustrates an example interface for creating or editing a mode;

DETAILED DESCRIPTION OF PREFERRED EMBODIMENTS

The following detailed description refers to the accompanying drawings. The same reference numbers in different drawings may identify the same or similar elements.

Systems and methods described herein may analyze information regarding user behavior patterns and/or preferences, and may present information (e.g., special offers, notifications of nearby vendors, etc.) to users based on a user's behavior and/or preferences. Information regarding the user's behavior may, in some implementations, be automatically collected (e.g., by a server that stores information regarding locations of a user device associated with the user). In some implementations, information regarding the user's preferences (e.g., locations that the user typically visits, routes on which the user typically travels, products in which the user is interested, restaurants the frequently visits, etc.) may be provided by a user.

Based on the user's behavior and/or preferences, and given one or more other factors (e.g., a time of day, geographical location, etc.), a user device (e.g., a cellular telephone) may automatically enter a particular mode. Additionally, or alternatively, a user may manually select a mode for the user device. As used herein, a "mode" may refer to a state in which a certain set of information, that may be relevant to the user's behavior and/or preferences, and the one or more other factors, may be presented to a user.

Figure 1A:
FIGS. 1A, 1B, 2A, 2B, and 3 illustrate an overview of one or more example implementations described herein.

For example, as shown in FIG. 1A, user device 105 may display an interface, through which a mode can be selected. Selectable options shown in FIG. 1A may correspond to the example modes: "shopping," "commute," "work," and "school." The interface displayed by user device 105 may also include other options, such as "select," "edit," and "new." Example functionality of the "edit" and "new" options are described in more detail below (e.g., with regard to FIG. 6).

Figure 1B:
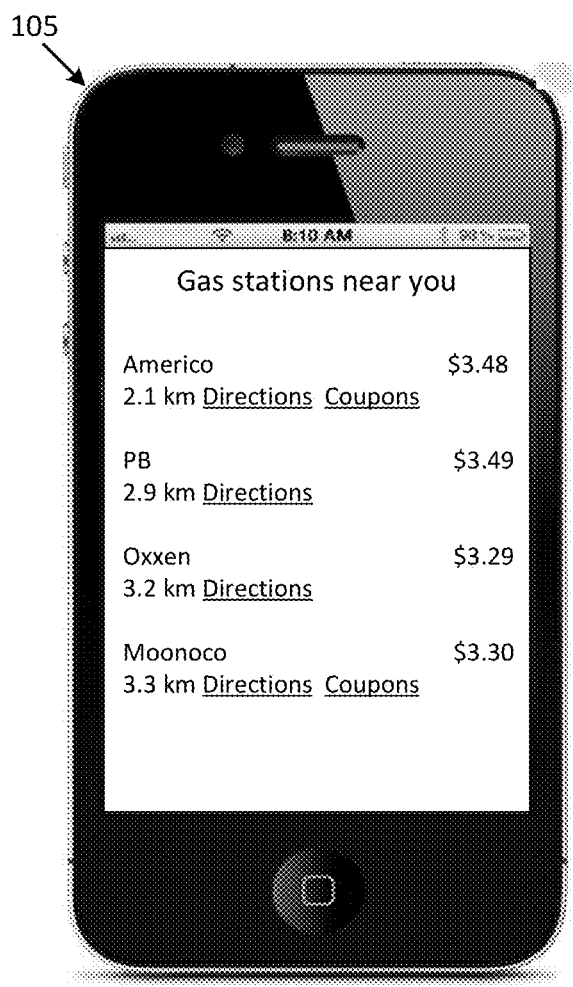

In this example, assume that a user, associated with user device 105, has selected the "commute" mode. In "commute" mode, user device 105 may present information, which may be relevant to the user's commute (and/or to commuting in general), to the user. FIG. 1B illustrates an example of information, associated with the selected "commute" mode, which may be presented by user device 105. The example information shown in FIG. 1B may include information relating to gas stations, which are in the vicinity of user device 105. As shown, user device 105 may display a list of gas stations. An entry for a particular gas station may include the name of the gas station, the distance of the gas station from user device 105, price of gas at the gas station, a link to directions to the gas station, and/or coupons associated with the gas station.

The information shown by user device 105 may, in some implementations, be presented without user interaction (e.g., via a "pop-up" window). For example, in some such implementations, user device 105 may display the information based on receiving an indication that a gas station is within a particular distance of user device 105. In some implementations, user device 105 may display the information based on receiving an indication that a vehicle, in which user device 105 is located, is low on gas (e.g., via a sensor communicatively coupled to the vehicle). In some implementations, user device 105 may present the information, shown in FIG. 1B, in response to a request from a user (e.g., a selection of an option to show information associated with the present mode).

Figure 2A:
Figure 2B:

FIGS. 2A and 2B illustrate another example of information that may be displayed by user device 105. In some implementations, a user's behavior patterns over time may be identified (e.g., based on locations that the user typically travels, times at which the user travels to such locations, etc.). Based on the user's behavior patterns, user device 105 may automatically enter a particular mode, and may display notifications that may be relevant to the user. For example, as shown in FIG. 2A, user device 105 may enter a mode that, based on an analysis of the user's behavior patterns, is associated with a time that a user typically buys coffee from a particular coffee shop. In this mode, user device 105 may, for example, display a notification, "It's coffee time!" User device 105 may also present options, such as "order" and "dismiss." The "dismiss" option may simply remove the notification from the display of user device 105, while the "order" option may allow the user to order coffee from the particular coffee shop.

For example, as shown in FIG. 2B, assume that the user has selected the "order" option shown in FIG. 2A. As shown, user device 105 may present options such as "coupons," "menu," and "previous orders." The "coupons" option may allow the user to view, for example, coupons associated with the particular coffee shop (and/or coupons that may be relevant to the particular coffee shop, such as coupons to other coffee shops and/or coupons for other vendors near the coffee shop). The "menu" option may allow the user to view a menu associated with the coffee shop (and/or menus associated with other coffee shops and/or restaurants). The "previous orders" option may allow a user to view previous orders placed by the user, and/or a favorite order. Via any of these options, the user may place an order (e.g., by providing credit card information, paying at the coffee shop using user device 105 (e.g., by using a near field communication ("NFC") payment technique, or via another payment technique).

Figure 3:
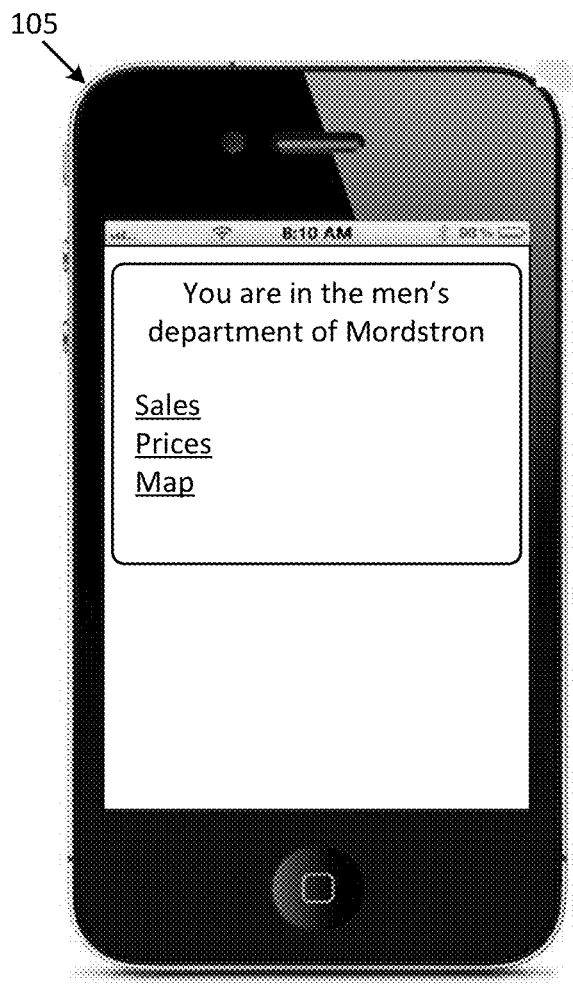

FIG. 3 illustrates yet another example of information that may be displayed by user device. As shown in FIG. 3, user device 105 may display information based on, for example, a location of user device 105 (e.g., independent of user behavior and/or preferences). In some implementations, the location may be as precise as, for example, a location within a department store. For instance, as shown in FIG. 3, user device 105 may provide a notification that a user is in the men's department of a department store. User device 105 may also provide options, such as "deals," "prices," and "map." The "sales" option may allow the user to view sales (e.g., sales within the men's department of the department store), the "prices" option may allow the user to view prices (e.g., prices of items, including non-sale items, within the men's department), and the "map" option may allow the user to view a map (e.g., a map of the department store).

By presenting information that is relevant to an activity that the user may be performing (e.g., commuting), user device 105 may enhance the user experience, by providing information that may be useful or interesting to the user. Furthermore, by automatically entering a particular mode, and/or by automatically displaying information once in a particular mode, user device 105 may enhance the user experience by minimizing the amount of interaction needed to receive useful information.

Figure 4:
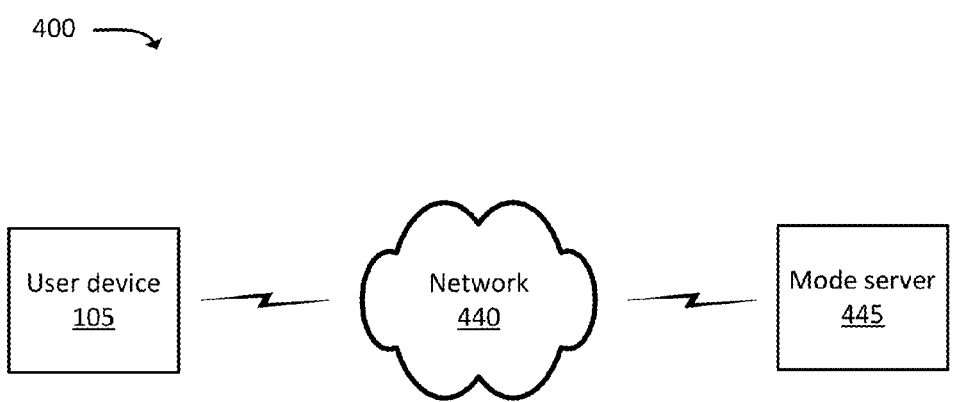
FIG. 4 illustrates an example environment in which systems and/or methods, described herein, may be implemented.

FIG. 4 illustrates an example environment 400, in which systems and/or methods described herein may be implemented. As shown in FIG. 4, environment 400 may include user device 105, network 440, and mode server 445. In practice, environment 400 may include additional user devices and/or servers. Also, in some instances, a user device may perform a function of a server, or a server may perform a function of a user device.

User device 105 may include any computation and communication device, such as a wireless mobile communication device that is capable of communicating with network 440. For example, user device 105 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 105 may send traffic to and/or receive traffic from network 440 via signal bearers, such as a base station, a serving gateway ("SGW"), a packet data network gateway ("PGW"), and/or another device.

Network 440 may include any type of network, such as a local area network ("LAN"), a wide area network ("WAN"), a telephone network—e.g., the Public Switched Telephone Network ("PSTN") or a cellular network (e.g., a long term evolution "LTE" network and/or an evolved packet core ("EPC") network that operate based on a third generation partnership project ("3GPP") wireless communication standard)—an intranet, the Internet, or a combination of networks. In some implementations, network 440 may be, at least partially, provided by one or more cellular network providers. That is, in some such implementations, network devices within, or associated with, network 440, may be provided by the one or more cellular network providers. User device 105 and/or mode server 445 may connect to network 440 via wired and/or wireless connections. In other words, user device 105 and/or mode engine server 445 may connect to network 440 via a wired connection, a wireless connection, or a combination of a wired connection and a wireless connection.

Mode server 445 may include one or more server devices that facilitate the presentation of information, which may be of interest to users, via user device 105. As described in further detail below, mode server 445 may receive and/or store information regarding behavior of users and or user device 105 (e.g., locations at which user device 105 is present, routes traveled by user device 105, demographic information associated with a user of user device 105, times at which user device 105 is present at particular locations and/or on particular routes, and/or other behavior information). In some implementations, mode server 445 may receive and/or store information regarding preferences of users (e.g., types of information desired by users, profiles generated or modified by users, etc.). As described in further detail below, mode server 445 may provide some of the information stored by mode server 445 to user device 105, in order to allow user device 105 to present information that may be of interest to a user of user device 105.

Figure 5:
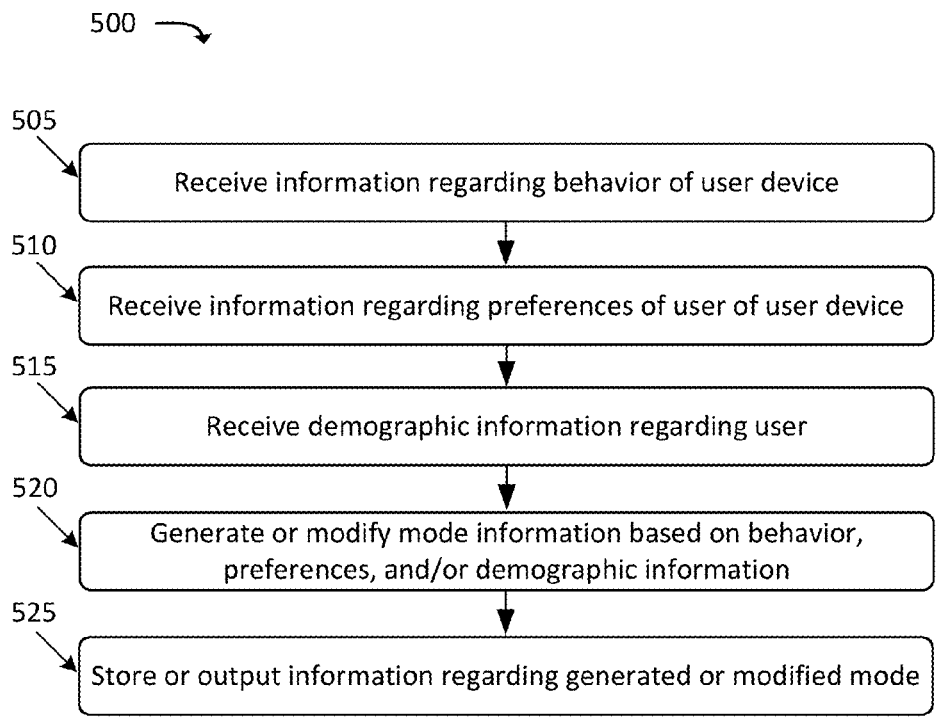
FIG. 5 illustrates an example process for generating mode information based on user device behavior patterns, user preferences, user demographic information, and/or other factors.

FIG. 5 illustrates an example process 500 for generating mode information based on user device behavior, user preferences, user demographic information, and/or other factors. In one example implementation, process 500 may be performed by mode server 445. In some implementations, some or all of process 500 may be performed by one or more other devices in addition to, or in lieu of, mode server 445. For example, in some implementations, some or all of process 500 may be performed by user device 105.

Process 500 may include receiving information regarding the behavior of a user device (block 505). For example, mode server 445 may receive information regarding the location of a particular user device 105 over time. This information may be collected by, and/or received from, network 440, which may use techniques such as cellular triangulation, or other network-based techniques. Additionally, or alternatively, this information may be collected by, and/or received from, user device 105, which may use global positioning system ("GPS") techniques. In some implementations, user device 105 may use location determination techniques involving WLAN, Bluetooth, near field communication ("NFC") protocol, or other wireless technologies (e.g., wireless technologies that may not necessarily be associated with network 440). In some implementations, the location information may be represented as, for example, a set of latitude and longitude coordinates.

Mode server 445 may, based on the received location information, identify frequently visited locations and/or routes associated with user device 105. In some implementations, mode server 445 may identify schedules associated with the frequently visited locations and/or routes. For instance, mode server 445 may identify that user device 105 is typically present at a particular location on Monday and Tuesday mornings between 9:00 AM and 9:30 AM. As another example, mode server 445 may identify that user device 105 typically travels on a particular route on weekdays, starting at 7:00 AM, and then subsequently remains at a particular location between 8:30 AM and 5:00 PM.

In some implementations, mode server 445 may receive and store information regarding particular geographical locations. For example, mode server 445 may receive information identifying buildings, businesses, landmarks, roads, and/or other information. This information may indicate, for example, that a particular business (e.g., a coffee shop, a department store, a gas station, or another type of business)

is located at a particular geographical location. Mode server 445 may correlate this information with user device behavior information to more specifically identify user device behavior. Continuing with the above examples, mode server 445 may identify that user device 105 typically is present at a particular coffee shop on Monday and Tuesday mornings between 9:00 AM and 9:30 AM. Additionally, mode server 445 may identify that user device 105 typically travels on a particular set of roads, in a particular set of directions, on weekdays, starting at 7:00 AM, and then subsequently remains at a particular office building between 8:30 AM and 5:00 PM.

The received information regarding geographical locations may also, in some situations, include other information associated with, for example, businesses that are located at or near these geographical locations. For example, the received information may include a menu associated with a restaurant, special offers or coupons associated with a store, a map of an inside of a building, etc. Mode server 445 may receive the information regarding the geographical locations from one or more sources, such as from businesses (e.g., a business may provide information regarding a geographical location of a building associated with the business), from a source that collects and/or stores information correlating geographical locations to businesses or other real-world features, etc.

Process 500 may also include receiving information regarding preferences of a user of the user device (block 510). For example, mode server 445 may receive information regarding user behavior (e.g., a location at which the user is typically present, a route on which the user typically travels, and/or a schedule associated with being present at the location or traveling on the route). That is, while mode server 445 may automatically determine (at block 505) user device behavior, mode server 445 may additionally, or alternatively, receive (at block 510) information from a user regarding user device behavior or preferences.

The preferences received (at block 510) may, in some implementations, include types of information, in which the user may be interested (e.g., types of information in which the user is interested when user device 105 is present in a particular location, at a particular time of day, etc.). For example, the preferences may indicate that when user device 105 is in or near a coffee shop, the user associated with user device 105 may be interested in receiving coupons or a menu associated with the coffee shop.

Process 500 may further include receiving demographic information regarding the user (block 515). The demographic information may include, for example, information regarding an age, gender, etc. of the user. In some implementations, the demographic information may include purchasing/shopping information associated with a user of user device 105. For example, the demographic information may indicate items purchased by the user (e.g., via user device 105 and/or via other avenues), prices paid for the items, dates on which the items were purchased, etc. Mode server 445 may receive the demographic information from one or more devices associated with network 440 (e.g., from a home subscriber service/authentication, authorization, and accounting ("HSS/AAA") server). Additionally, or alternatively, mode server 445 may receive the demographic information from another source, such as from user device 105 (e.g., as manually provided by the user).

Process 500 may additionally include generating or modifying mode information based on the behavior, preferences, and/or the demographic information (block 520). A generated or modified mode may specify, for example, a set of conditions upon which the mode should be activated, a set of conditions upon which the mode should be deactivated, a set of information that should be presented when the mode is activated, and/or an indication of how the set of information should be presented (e.g., a schedule at which the information should be presented; or an indication of whether the information should be presented via a "pop-up" message, a SMS message, an e-mail, etc.).

Continuing with the above example, where mode server 445 identifies that user device 105 is often in the vicinity of a particular coffee shop on Monday and Tuesday mornings between 9:00 AM and 9:30 AM, mode server 445 may generate, for instance, a "coffee" mode. The generated "coffee" mode may include information indicating that this mode should be activated automatically between 9:00 AM and 9:30 AM, and that information should be presented that is relevant to the particular coffee shop (e.g., special offers, menus, options to place an order, etc.) when the mode is active. Additionally, or alternatively, this mode may be generated based on user preferences. For instance, a particular user preference may indicate a favorite coffee that is sold by the particular coffee shop. In this example, the generated "coffee" mode may include information indicating that an option to order the user's favorite coffee should be presented to the user when this mode is active.

As another example, assume that mode server 445 identifies that user device 105 travels along a particular set of roads on weekdays, starting at 7:00 AM. Mode server 445 may generate a "commute" mode based on this route, which may be activated automatically on weekdays at 7:00 AM. The "commute" mode may include information indicating that information relevant to the commute should be presented to the user, such as locations of gas stations, traffic information and/or alerts along the commuting route, or other relevant information.

In some implementations, mode server 445 may additionally, or alternatively, generate (at block 520) a mode based on demographic information associated with the user. For example, assume that the demographic information indicates a particular type of product that the user typically purchases, such as computer software, when in a particular store. Mode server 445 may generate a "shopping" mode associated with the particular store. The "shopping" mode may present the user with information regarding computer software, such as discounts on computer software that are being offered by the store. In some implementations, mode server 445 may forgo including some demographic information, which may skew the generated mode. For instance, assume that the user once purchased a television at the same store. When generating the "shopping" mode, mode server 445 may omit the information regarding the purchase of the television, as such behavior may not be indicative of typical behavior. That is, even though the user purchased a television from the store, it may not necessarily be likely that the user will purchase more televisions when visiting the same store.

In some implementations, mode server 445 may modify an existing mode. For example, assume that mode server 445 stores information regarding a previously-generated "coffee" mode. Over time, mode server 445 may receive information, based on which the "coffee" mode should be modified. For instance, mode server 445 may receive information (e.g., based on analyzing automatically collected data, and/or based on receiving information provided by the user) indicating that a user may begin visiting the coffee shop at a different time, may order a different beverage at the coffee shop, may start visiting a different coffee shop, etc. Based on this received information, mode server 445 may modify the existing mode.

Process 500 may also include storing or outputting information regarding the generated or modified mode (block 525). For example, mode server 445 may store information associating the mode (generated or modified at block 520) with a particular user device 105. In some implementations, mode server 445 may store a set of mode profiles, each mode profile being associated with a different user device 105. A "mode profile" may refer to a set of modes associated with a particular user device 105. In some implementations, a mode profile may include a set of modes, such that a mode is always active (e.g., a mode for when a user sleeps, a mode for when the user eats breakfast, a mode for the user's commute to work, a mode for the user's work day, a mode for the user's commute home from work, etc.). In some implementations, a mode profile may include a set of modes, such that there may be times where no modes are active.

Additionally, or alternatively, mode server 445 may output information regarding modes to user device 105, and/or to another device (e.g., a repository that stores modes, a server from which modes may be shared, etc.). While some example modes (e.g., a "coffee" mode, a "commute" mode, etc.) are described above with regard to FIG. 5, in practice, other types of mode may be generated. That is, in practice, a particular mode may be triggered by an event (e.g., the occurrence of a schedule or a time event, the presence of user device 105 at a particular location, and/or another event), and the particular mode may cause any type of information to be provided to, or requested from, a user of user device 105.

Figure 6:
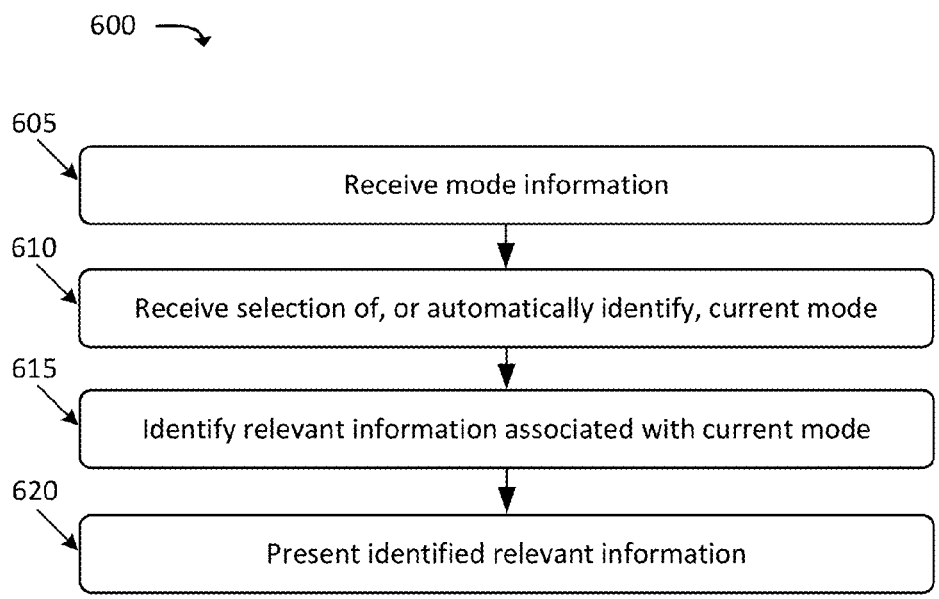
FIG. 6 illustrates an example process for presenting information that may be of interest to a user.

FIG. 6 illustrates an example process 600 for presenting information that may be of interest to a user. In one example implementation, process 600 may be performed by user device 105. In some implementations, some or all of process 600 may be performed by one or more other devices in addition to, or in lieu of, user device 105. For example, in some implementations, some or all of process 600 may be performed by mode server 445.

Figure 8:
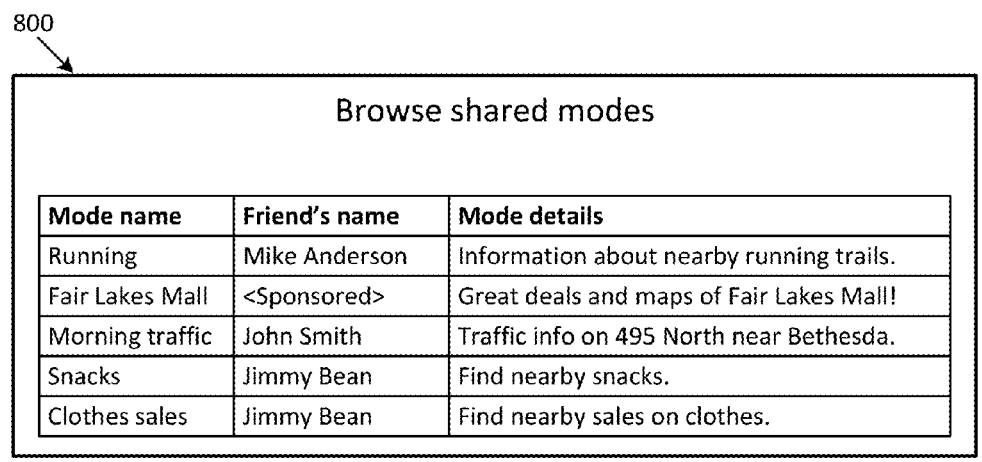
FIG. 8 illustrates an example interface for browsing for shared modes.

Process 600 may include receiving mode information (block 605). For example, user device 105 may receive mode information from mode server 445 (e.g., mode information outputted by mode server 445 at block 525 of process 500). Additionally, or alternatively, user device 105 may receive mode information from a user. FIG. 7, described below, illustrates an example interface 700, via which a user (e.g., a user of user device 105) may define a mode. Additionally, or alternatively, user device 105 may receive the mode information from another source, such as from a repository that stores mode information. FIG. 8, described below, illustrates an example interface 800, via which the user may select a mode in which the user is interested.

User device 105 may store the received mode information. For instance, user device 105 may store the received mode information as part of a mode profile associated with user device 105.

Process 600 may also include receiving a selection of, or automatically identifying, a current mode (block 610). For instance, user device 105 may automatically identify, based on one or more factors (e.g., date, time, day of week, geographical location, and/or another factor), whether a particular mode is applicable. That is, in some implementations, user device 105 may compare the one or more factors to information regarding modes associated with user device, such as information indicating when a particular mode should be active. For instance, assume a particular mode indicates that the mode should be active at 5:00 PM on Wednesdays. In this situation, user device 105 may automatically activate the mode at 5:00 PM on a Wednesday.

User device 105 may, in some situations, override a currently activated mode based on the one or more factors. In some implementations, when overriding the currently activated mode, user device 105 may deactivate the mode, and activate another mode. In some implementations, when overriding the currently activated mode, user device 105 may additionally activate another mode (e.g., in some such implementations, two or more modes may be active concurrently). Such a situation may occur when, for example, factors associated with a user device more closely fit a particular mode than a currently active mode.

For example, assume that a user typically commutes from work to home on weekday afternoons. Thus, user device 105 may activate a "commute" mode during these times. Further assume that one particular weekday, the user stops at a department store during his or her normal commuting time. In this situation, user device 105 may override the "commute" mode with a "shopping" mode, based on, for example, identifying that the geographical location of user device 105 matches the geographical location of the department store.

In some implementations, user device 105 may receive (at block 610) a selection of a particular mode. For instance, user device 105 may receive, via an interface, such as the example interface shown in FIG. 1A, a selection of a mode from a user. Based on this selection, user device 105 may activate the selected mode.

Process 600 may further include identifying relevant information associated with the current mode (block 615). For example, the mode information (received at block 605) may indicate the type of information that is relevant to the current mode. For example, the mode information may indicate that a particular mode is associated with coupons, menus, catalogs, maps, directions, and/or other types of information. In some implementations, mode information (received at block 605) may include some or all of the information that is relevant to the mode. In some implementations, user device 105 may retrieve or receive the relevant information from one or more other sources. For instance, when a "coffee" mode is activated, user device 105 may request currently available coupons from another device, such as a server that provides coupon information (e.g., via a uniform resource link ("URL") to a resource that is available on the Internet).

The relevant information may, additionally, or alternatively, be identified based on one or more other factors, such as time of day, day of week, geographical location of user device 115, etc. In some implementations, the relevant information may be identified based on demographic information associated with a user of user device 105. For instance, assume that two users, each associated with a different user device 105, are in the same department store. Further assume that both user devices 105 are in the same "shopping" mode. Further still, assume that one user is an 18-year old male, while the other user is a 65-year old female. User device 105, associated with the 18-year old male, may present information that may be of interest to 18-year old males, but may not necessarily be of interest to 65-year old females, such as coupons for athletic clothing, coupons for menswear, directions to the men's section of the department store, etc. On the other hand, user device 105, associated with the 65-year old female, may present information that may be of interest to 65-year old females, but may not necessarily be of interest to 18-year old males, such as coupons for women's jewelry, a catalog that exhibits perfume sold by the department store, directions to the women's apparel section of the department store, etc.

Process 600 may additionally include presenting the identified relevant information (block 620). For example, user device 105 may visually and/or audibly output some or all of the relevant information identified at block 615. FIGS. 1B-3, described above, illustrate some examples of interfaces, via which user device 105 may present the identified relevant information. While these interfaces are illustrated as examples, in practice, the identified relevant information may be presented in other ways.

In some implementations, user device 105 may present the relevant information as a "pop-up" window (e.g., a visual notification that graphically covers other graphical information shown by user device 105). In some implementations, user device 105 may present the relevant information via a messaging application associated with user device (e.g., via an SMS messaging application, an e-mail application, an instant messaging application, or some other application).

In some implementations, user device 105 may deactivate an active mode at an appropriate time. For example, some modes may indicate a start condition and end condition (e.g., a time at which the mode should be deactivated, a duration that the mode should be active, etc.). In some implementations, user device 105 may deactivate an active mode after a pre-determined, or default, amount of time (e.g., within 30 minutes of activating a mode, within one hour of activating a mode, etc.). In some implementations, user device 105 may prompt a user for permission to deactivate an active mode, and may not deactivate the mode unless the user indicates that the user wishes to deactivate the mode.

FIG. 7 illustrates an example interface 700 for creating or editing a mode. In some implementations, interface 700 may be presented by user device 105, and in some implementations, interface 700 may be presented by another device (e.g., a computing device associated with an administrator of mode server 445, a personal computer associated with a user of user device 105, etc.). Interface 700 may be displayed in response to a selection of an option to create a new mode, or in response to a selection of an option to edit a mode (e.g., "new" or "edit" options shown in FIG. 1A).

As shown in FIG. 7, interface 700 may include a set of fields, such as a "mode name," "schedule," "start location," "end location," "type," and "description." A user may enter information relating to a new mode into the fields shown in FIG. 7. The "schedule" field may indicate a schedule, on which the mode may be automatically activated by user device 105. The "start location" field and the "end location" field may allow the user to create a mode that is associated with a route between two locations. The "type" field may allow the user to specify one or more types of information that the user desires to receive when the mode is active (e.g., coupons, catalogs, maps, etc.). The "description" field may allow the user to provide a description, which may help the user and/or other users to quickly determine the details of the mode.

In some situations, the user may leave one or more of the fields blank, as not all of the fields may necessarily apply for a particular mode. For instance, assume that the user desires to create a new mode that is associated with a particular store. In this situation, the user may leave the "end location" field blank, or may enter the same location in the "start location" field and the "end location" field. While some examples of fields are displayed in FIG. 7, in practice, additional, fewer, different, or differently arranged fields may be used in interface 700.

As further shown in FIG. 7, interface 700 may include a "save" option and a "share" option. Selection of the "save" option may cause user device 105 to store the mode, and/or to output the mode to mode server 445. Selection of the "share" option may cause user device 105 to output the mode to a repository that stores modes, from which other users may browse and download created modes.

FIG. 8 illustrates an example interface 800 for browsing for shared modes. In some implementations, interface 800 may be presented by user device 105, and in some implementations, interface 800 may be presented by another device (e.g., a computing device associated with an administrator of mode server 445, a personal computer associated with a user of user device 105, etc.).

As shown in FIG. 8, interface 800 may include information regarding a set of modes. These modes may be shared with a particular user, and interface 800 may be displayed by user device 105, which may be owed by the particular user. In some implementations, interface 800 may be associated with a social networking application, through which one or more other users may have previously shared the displayed modes with the user of user device 105. Interface 800 may include fields such as a "mode name" field, a "friend's name" field, and a "mode details" field. The "friend's name" field may indicate a creator of a particular mode, and/or a person who shared the particular mode.

The "mode details" field may indicate details associated with a particular mode, and may include, for example, text from a "mode description" field upon creation of the mode (e.g., the "mode description" field shown in FIG. 7). Additionally, or alternatively, the "mode details" field may include an automatically generated description of one or more details associated with the mode, such as conditions upon which the mode becomes active, and/or one or more types of information which may be presented when the mode is active.

As shown in FIG. 8, one or more shared modes may be a sponsored mode. For example, an advertiser may pay (e.g., may pay an entity that owns network 440, an entity that owns mode server 445, an entity that owns a social networking application via which interface 800 is displayed, and/or another entity) for a sponsored mode to appear in interface 800 for a particular user based on, for example, demographic information associated with the user. While some examples of fields are displayed in FIG. 8, in practice, additional, fewer, different, or differently arranged fields may be used in interface 800.

Figure 9:
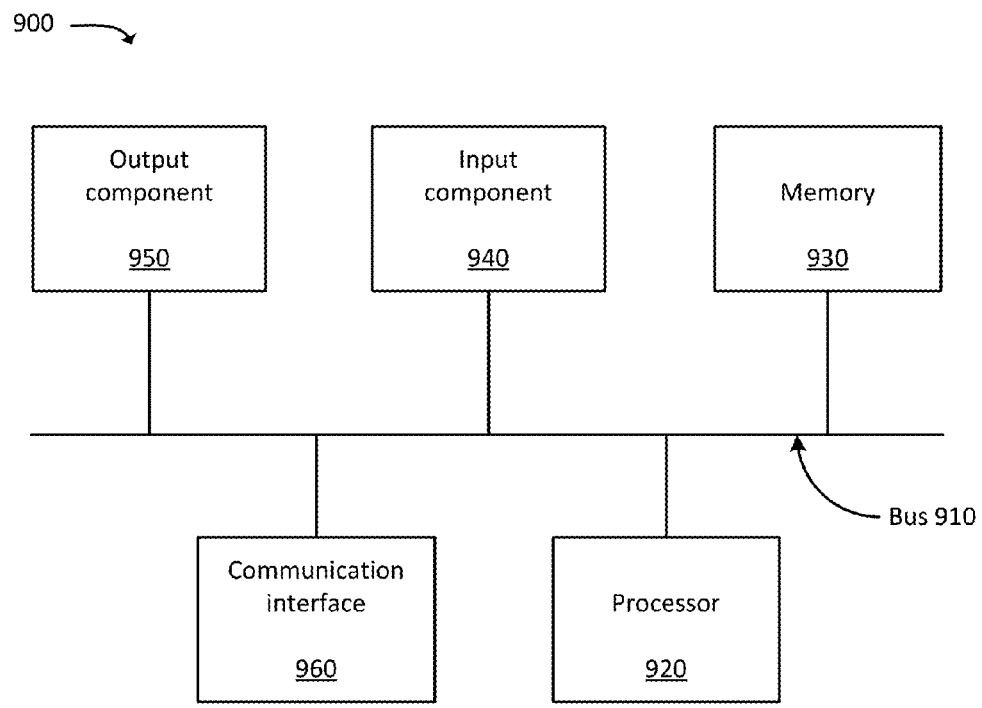
FIG. 9 illustrates example components of one or more devices shown in FIGS. 1A, 2A, 3A, 3B, and 4.

FIG. 9 is a diagram of example components of device 900. Each of the devices illustrated in FIGS. 1A, 1B, 2A, 3A, and 4 may include one or more devices 900. Device 900 may include bus 910, processor 920, memory 930, input component 940, output component 950, and communication interface 960. In another implementation, device 900 may include additional, fewer, different, or differently arranged components. Some non-limiting examples of device 900, with additional and/or different components, are discussed below.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 5, the order of the blocks may be modified in other implementations. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, behavior information associated with a user device, the behavior information indicating a set of geographical locations at which the user device has been present;
   automatically generating, by the server device, a first mode based on the behavior information, the first mode indicating:
      a first set of conditions based on which the first mode is to be activated,
      the first set of conditions including a condition that specifies a particular geographic location, and
      a first set of information to be presented when the mode is activated;
   presenting, by the server device, a list of modes, the list of modes including at least:
      the automatically generated first mode, and
      one or more user-created modes that have been generated and shared by one or more users, the one or more user-created modes including:
         a second set of conditions based on which the second mode is to be activated, the second set of conditions having been specified by the one or more users, and
         a second set of information to be presented when at least a particular one of the one or more user-created modes is activated, the second set of information having been specified by the one or more users;
   receiving a selection, from the user device, for a particular mode, in the list of modes; and
   outputting, by the server device, information regarding the selected particular mode to the user device, wherein the user device:
      monitors a geographic location of the user device to determine a present geographic location of the user device at a particular time,
      compares the present geographic location, of the user device, to a particular geographic location, specified in a particular set of conditions associated with the selected particular mode,
      determines, based on the monitoring and comparing, that the particular set of conditions, associated with the selected particular mode, has been satisfied, and
      activates, at the particular time, the selected particular mode when the particular set of conditions is satisfied, the activating including providing a set of information, associated with the selected particular mode, without user interaction.

2. The method of claim 1, further comprising:
   receiving at least one of:
      a set of user preferences, or
      demographic information associated with a user of the user device;

wherein generating the first mode, by the server device, is further based on the at least one of the set of user preferences or the demographic information associated with the user.

3. The method of claim 2, wherein the set of user preferences indicates a type of information, desired by the user, to be presented when the first mode is activated.

4. The method of claim 1, wherein the first set of conditions includes at least one of:
a first condition based on a date,
a second condition based on time of day,
a third condition based on day of week, or
a fourth condition based on a geographical location of the user device.

5. The method of claim 1, wherein the behavior information further indicates a set of times during which the user device has been present at the geographical locations, and
wherein the first set of conditions is based on the set of times during which the user device has been present at the geographical locations.

6. The method of claim 1, further comprising:
receiving information regarding at least one of:
a building,
a geographical location associated with a business,
a landmark, or
a road,
wherein the first set of conditions is based on the received information regarding the at least one of the building, the geographical location associated with the business, the landmark, or the road.

7. The method of claim 1, wherein the behavior information is determined based on automatically collected data regarding the user device.

8. A user device, comprising:
one or more memory devices to store a set of instructions; and
one or more processors to execute the instructions, to:
receive information regarding a plurality of modes that have been generated and shared by one or more users, a particular mode indicating:
a set of conditions based on which the particular mode is to be activated, the set of conditions including a condition that specifies a geographic location, the set of conditions having been specified by the one or more users, and
a set of information to be presented when the mode is activated, the set of information having been specified by the one or more users;
receive a selection of a particular mode, from the list of modes;
obtain, from a server device, the selected mode;
monitor a geographic location of the user device to determine a present geographic location of the user device;
compare the present geographic location of the user device to the geographic location included in the set of conditions associated with the selected mode;
determine, based on comparing the present geographical location of the user device to the geographic location included in the set of conditions, that the set of conditions associated with the selected mode has been satisfied;
activate the mode, based on determining that the set of conditions has been satisfied; and
automatically present at least a portion of the set of information, based on activating the mode, the automatic presentation occurring at a time that corresponds a time at which the present geographic location of the user device was determined.

9. The user device of claim 8, wherein the mode is generated based on past behavior of the user device.

10. The user device of claim 9, wherein the past behavior includes information regarding a set of geographical locations at which the user device has been present.

11. The user device of claim 8, wherein when determining that the set of conditions has been satisfied, the one or more processors are to determine that a geographical location of the user device corresponds to a geographical location of a business,
wherein when presenting the at least the portion of the set of information, the one or more processors are to present at least one of:
a list of products offered for sale by the business,
a set of coupons associated with the business,
a map associated with the business, or
an option to purchase one or more products offered for sale by the business.

12. The user device of claim 8, wherein the set of conditions, associated with the selected mode, further includes at least one of:
a first condition based on a date,
a second condition based on time of day, or
a third condition based on day of week.

13. The user device of claim 8, wherein the condition, that specifies a particular geographic location, includes a starting location and an ending location, and wherein the condition is satisfied when the user device is located on a route that is between the starting location and the ending location.

14. A computer-readable medium, comprising:
a plurality of computer-executable instructions, which, when executed by one or more processors, cause the one or more processors to:
receive behavior information associated with a user device, the behavior information indicating a set of geographical locations at which the user device has been present;
automatically generate a first mode based on the behavior information, the first mode indicating:
a first set of conditions based on which the mode is to be activated,
the first set of conditions including a condition that specifies a particular geographic location, and
a first set of information to be presented when the mode is activated;
present a list of modes, the list of modes including at least:
the automatically generated first mode, and
one or more user-created modes that have been generated and shared by one or more users, the one or more user-created modes including:
a second set of conditions based on which the second mode is to be activated, the second set of conditions having been specified by the one or more users, and
a second set of information to be presented when at least a particular one of the one or more user-created modes is activated, the second set of information having been specified by the one or more users;
receive a selection, from the user device, for a particular mode, in the list of modes; and
output the selected mode to the user device,
wherein the user device determines, based on the information regarding the selected mode, that a particular set of conditions, associated with the selected mode, has been satisfied by comparing a present geographical location of the user device to a particular geographic location included in the particular set of conditions associated with the selected mode, and wherein the user device activates the selected mode when the particular set of conditions is satisfied, the activating including automatically presenting a set of information associated with the selected mode.

15. The computer-readable medium of claim 14, wherein the plurality of computer-executable instructions further cause the one or more processors to:

receive at least one of:
a set of user preferences, or
demographic information associated with a user of the user device;
wherein generating the first mode is further based on the at least one of the set of user preferences or the demographic information associated with the user.

16. The computer-readable medium of claim 15, wherein the set of user preferences indicates a type of information to be presented when the first mode is activated.

17. The computer-readable medium of claim 14, wherein the set of conditions, associated with the selected mode, includes at least one of:
a first condition based on a date,
a second condition based on time of day, or
a third condition based on day of week.

18. The computer-readable medium of claim 14, wherein the behavior information further indicates a set of times during which the user device has been present at the geographical locations,
wherein the set of conditions, associated with the selected mode, is based on the set of times during which the user device has been present at the geographical locations.

19. The computer-readable medium of claim 14, wherein the plurality of computer-executable instructions further cause the one or more processors to:

receive information regarding at least one of:
a building,
a geographical location associated with a business,
a landmark, or
a road,
wherein the set of conditions, associated with the selected mode, is based on the received information regarding the at least one of the building, the geographical location associated with the business, the landmark, or the road.

20. The computer-readable medium of claim 14, wherein the behavior information is determined based on automatically collected data regarding the user device.

* * * * *